Sept. 15, 1970 W. F. BARTLETT ET AL 3,529,302

THIN FILM MAGNETIC MEMORY SWITCHING ARRANGEMENT

Filed Oct. 16, 1968 6 Sheets-Sheet 1

*INVENTORS*
WILLIAM F. BARTLETT
FRANK NIERTIT
THADDEUS F. BRYZINSKI

Hoffman Stone
ATTORNEY

INVENTORS
WILLIAM F. BARTLETT
FRANK NIERTIT
THADDEUS F. BRYZINSKI
BY [signature]
ATTORNEY Sept. 15, 1970 W. F. BARTLETT ET AL 3,529,302

THIN FILM MAGNETIC MEMORY SWITCHING ARRANGEMENT

Filed Oct. 16, 1968 6 Sheets-Sheet 3

INVENTORS
WILLIAM F. BARTLETT
FRANK NIERTIT
BY THADDEUS F. BRYZINSKI

Hoffman Stone

ATTORNEY

INVENTORS
WILLIAM F. BARTLETT
FRANK NIERTIT
THADDEUS F. BRYZINSKI
BY [signature]
ATTORNEY

THIN FILM MAGNETIC MEMORY SWITCHING ARRANGEMENT

Filed Oct. 16, 1968 6 Sheets-Sheet 5

INVENTORS
WILLIAM F. BARTLETT
FRANK NIERTIT
THADDEUS F. BRYZINSKI
BY Hoffman Stone
ATTY.

THIN FILM MAGNETIC MEMORY SWITCHING ARRANGEMENT

Filed Oct. 16, 1968 6 Sheets-Sheet 6

INVENTORS
WILLIAM F. BARTLETT
FRANK NIERTIT
THADDEUS F. BRYZINSKI
BY
Hoffman Stone
ATTORNEY United States Patent Office 3,529,302
Patented Sept. 15, 1970

3,529,302

THIN FILM MAGNETIC MEMORY SWITCHING ARRANGEMENT

William F. Bartlett, Rochester, and Thaddeus F. Bryzinski and Frank Niertit, West Webster, N.Y., assignors to Stromberg-Carlson Corporation, Rochester, N.Y., a corporation of Delaware Filed Oct. 16, 1968, Ser. No. 767,939
Int. Cl. G11c *5/02, 11/14*
U.S. Cl. 340—174 3 Claims

ABSTRACT OF THE DISCLOSURE

A magnetic memory of large capacity and high density storage configuration, with a switching arrangement for inserting data into and retrieving data from it. Thin films of anisotropic magnetic material electroplated on wires constitute the storage media. The wires are closely spaced in planar arrays, each array being encircled by conductive straps extending normally to the wires. Electric currents in the straps disturb the remanent flux in the magnetic films to produce electrical signals in the wires indicating the data stored in the magnetic films. The wires are connected in bridge circuits, each bridge including one wire from each of four different arrays.

The switching arrangement includes address matrices, which drive gates arranged in accordance with crossed coordinate systems, enabling data to be inserted in or retrieved from any selected group of locations in any one of the arrays.

BRIEF SUMMARY

This invention relates to a novel, high speed, signal storage apparatus, and, more particularly, to a novel scheme for switching electrical signals for the operation of a so called thin film magnetic storage device of the random access type capable of non-destructive read-out.

The invention arose in connection with the development of a magnetic memory of relatively large capacity and high density storage capability, and was directed primarily toward minimizing the amount of circuitry required to operate the memory without sacrifice of performance capability, reliability and overall quality. While the principles of the invention are expected to be applicable in a variety of different utilizations, and the size of the memory unit is not a limiting factor, the invention will be more easily understood when considered in connection with an actual system specifying, by way of example only, actual numbers for the various different components.

Magnetic thin film signal storage devices are known and are commercially available, although they have been introduced only relatively recently. One type comprises as its basic unit a non-magnetic wire, which may be, for example, of a copper-beryllium alloy and about .005 inch in diameter, coated with an anisotropic magnetic material about one micron thick. The coating is applied, usually by electroplating, in such a way that it is more easily magnetized circumferentially of the wire than longitudinally. When a flux, once established circumferentially in a selected portion of the coating, is disturbed by the application of an external field in the longitudinal direction, the flux path is distorted toward the longitudinal direction, producing a momentary electrical signal in the wire. When the disturbing field is removed, the flux returns to its original direction, producing a second momentary signal, of opposite polarity from the first one. If a current is passed through the wire in the appropriate direction during the decay of the disturbing magnetic field, an over-center action can be produced, and the flux then becomes re-established circumferentially, but opposite from its initial direction.

Memories of this type are normally used to store signals in binary form. Flux in one circumferential direction denotes a binary one, and in the oposite direction a zero. Only a relatively small length of the coating is needed for storing each binary digit. For example, output signals of about ten to fifteen millivolts across an open circuit can be produced by about a .03 inch length of a magnetic film about one micron thick carried by a .005 inch diameter wire. Memories of this type operate by domain rotation, rather than by motion of the walls of the magnetic domains, and are capable of relatively high speed operation. Typically, output signals consist of pulses lasting about seventy nanoseconds or less. The principal speed limitation at present seems to be the time required to produce the disturbing magnetic field and for the disturbing field to decay.

Briefly, in accordance with the present invention, wires carrying the magnetic films are arranged in closely spaced parallel arrays. Each array is encircled by conductors called word straps, extending normally across the wires and electrically insulated from them. Each word strap constitutes a single turn coil around each one of the wires in its array. When a current is passed through one of the word straps, a disturbing magnetic field, that is, a field in the longitudinal direction along the wires, is applied to a short portion of each of the wires in the array. Each of the short portions constitutes a storage element. The wires may be spaced, for example, on about .015 inch centers, and the straps may be spaced on about .05 inch centers, resulting in a relatively high density storage capacity. In a memory unit designed to store approximately five million individual signals, called bits, there may be four arrays, each comprising 2432 wires, and 512 straps. In the arrangement described herein, the wires are electrically connected in bridge circuits, each bridge including one wire from each of the four arrays. The arrangement is such that only one array is dealt with at any one time, so output signals can be read as unbalances in the bridges.

The logic for reading and writing is simplified to a high degree by the use of what may be called a compound address selection system. For example, all of the word straps in each array are connected in common to the output of a single amplifier, which furnishes the energizing pulses. The circuits through the word straps are completed through a selection matrix, which is shared by all of the arrays, and which includes a number of switching points equal to the number of word straps in only one array. A generally similar system is used for the selection of a particular group of the bridge circuits for writing, two switching actions being provided for each address according to a crossed coordinate pattern.

DETAILED DESCRIPTION

A presently preferred embodiment of the invention will now be described in detail in connection with the accompanying drawings, wherein.

Figure 2:
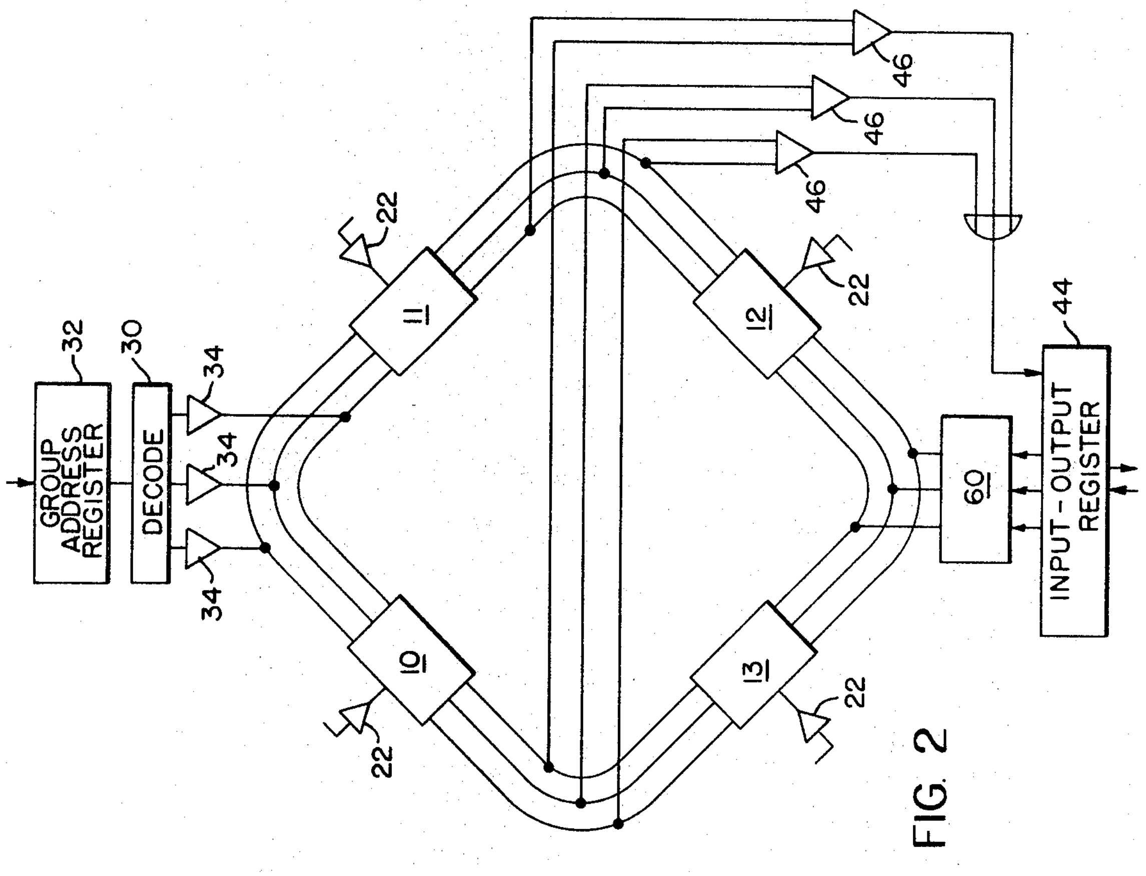
FIG. 2 is a partial block schematic diagram generally similar to the diagram of FIG. 1, but showing the bridge arrangement for producing read-out signals, and the coordinate selection system for applying WRITE currents to the bit wires.
Figure 1:
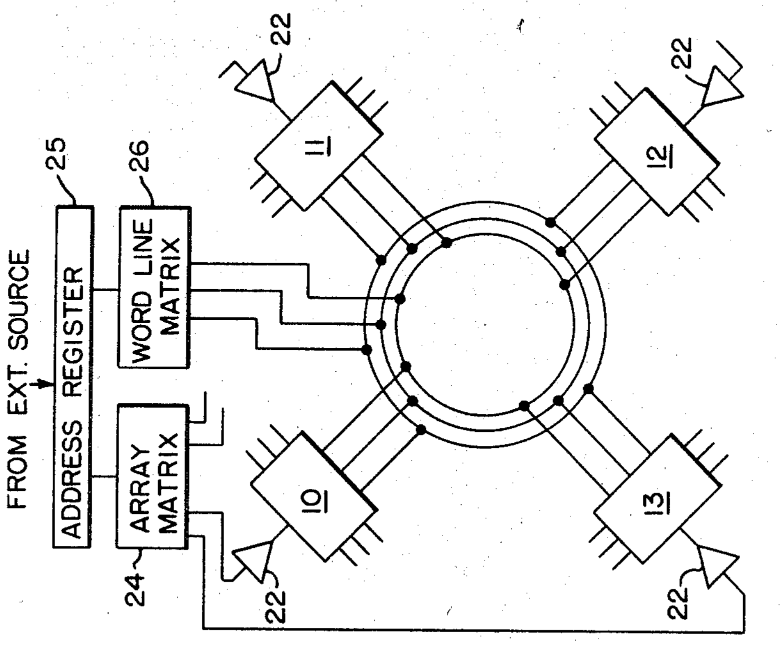
FIG. 1 is a partial schematic block diagram of a memory according to the invention illustrating the coordinate selection arrangement for selecting a particular word strap.
Figure 3A:
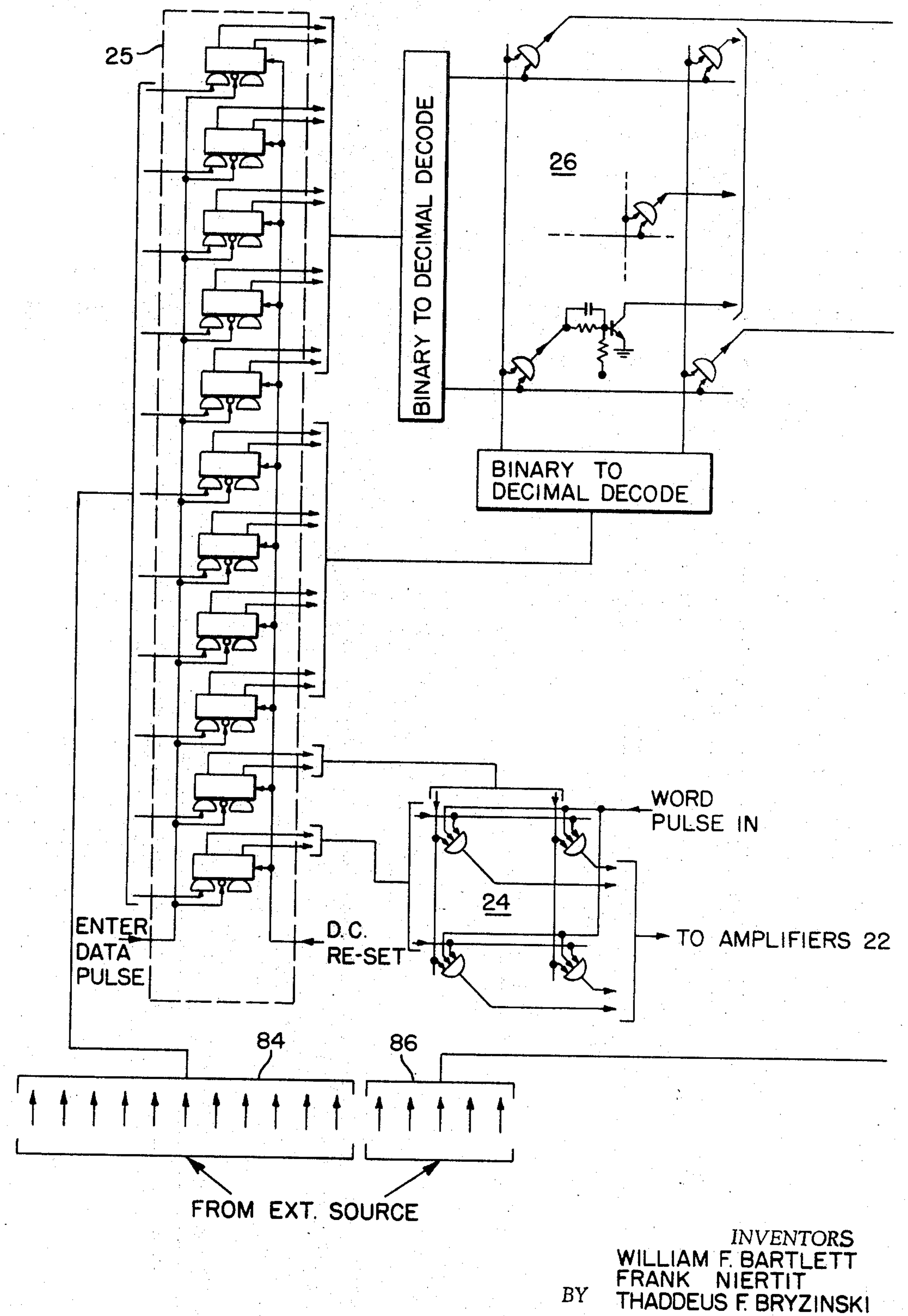
Figure 3B:
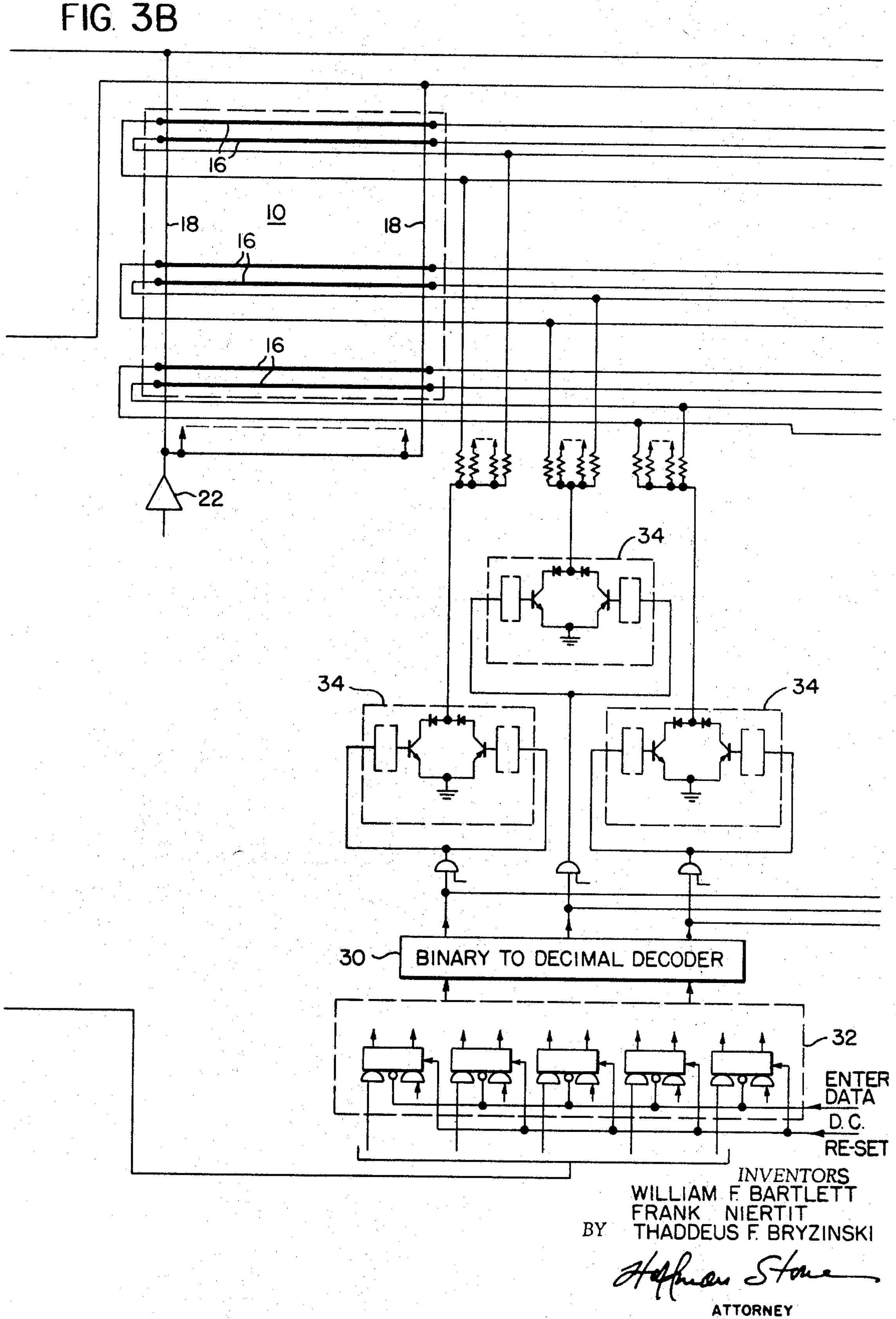
Figure 3C:
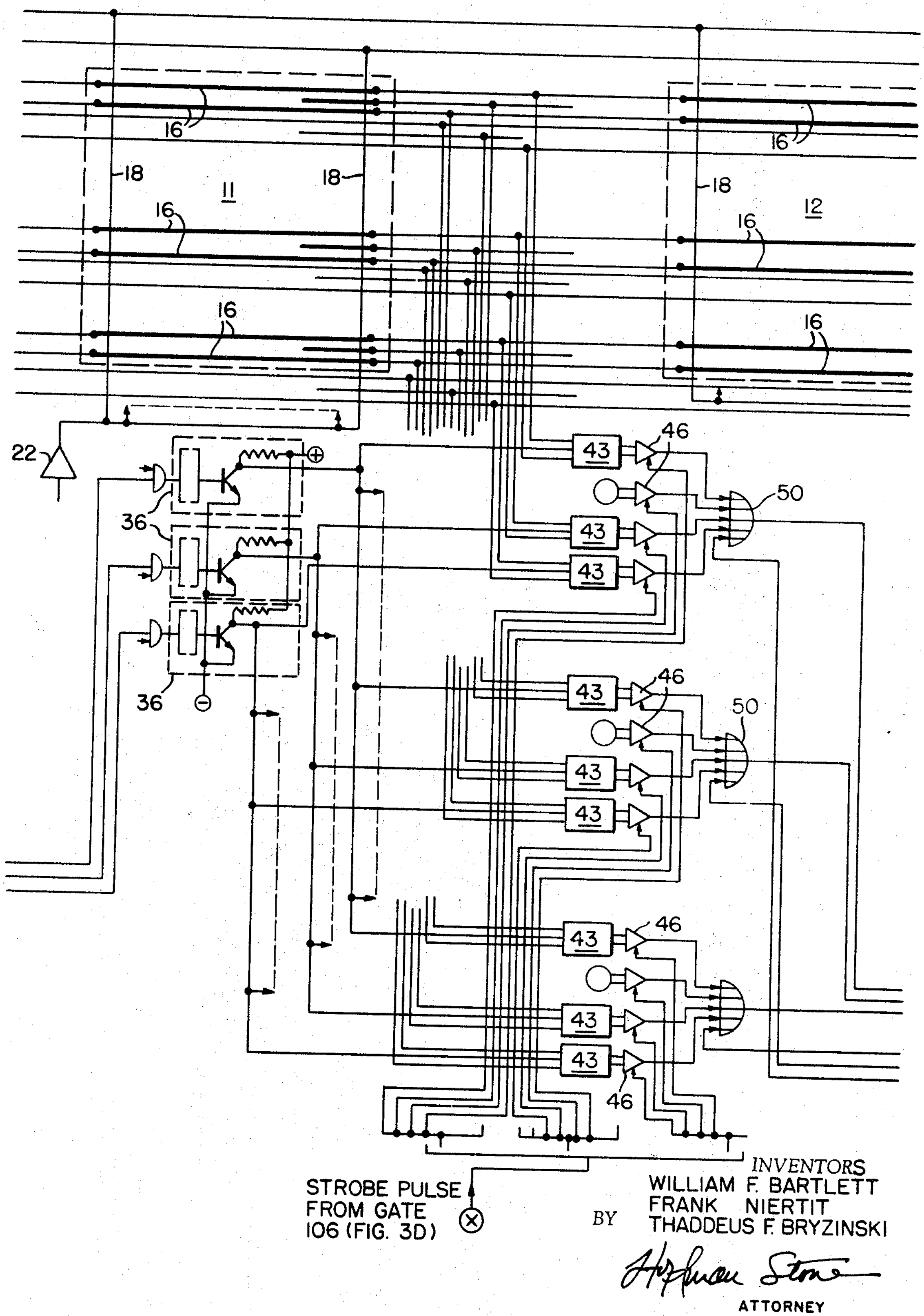
Figure 4:
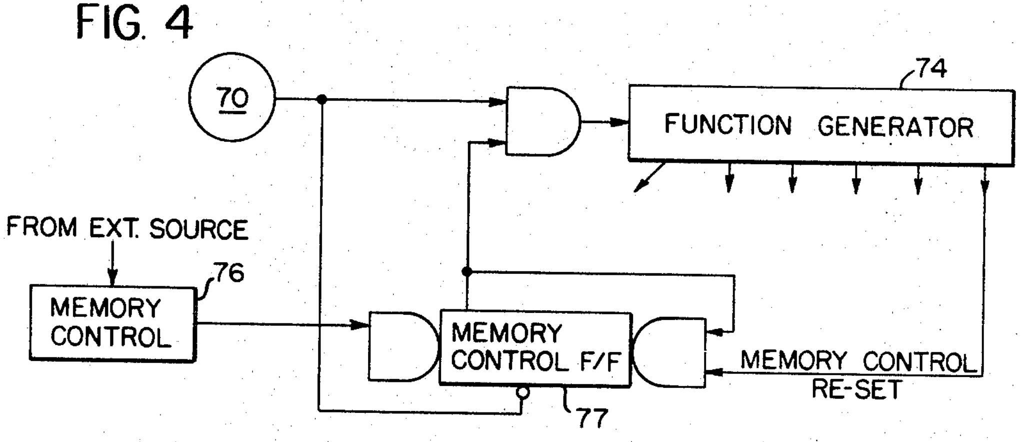
Figure 6:
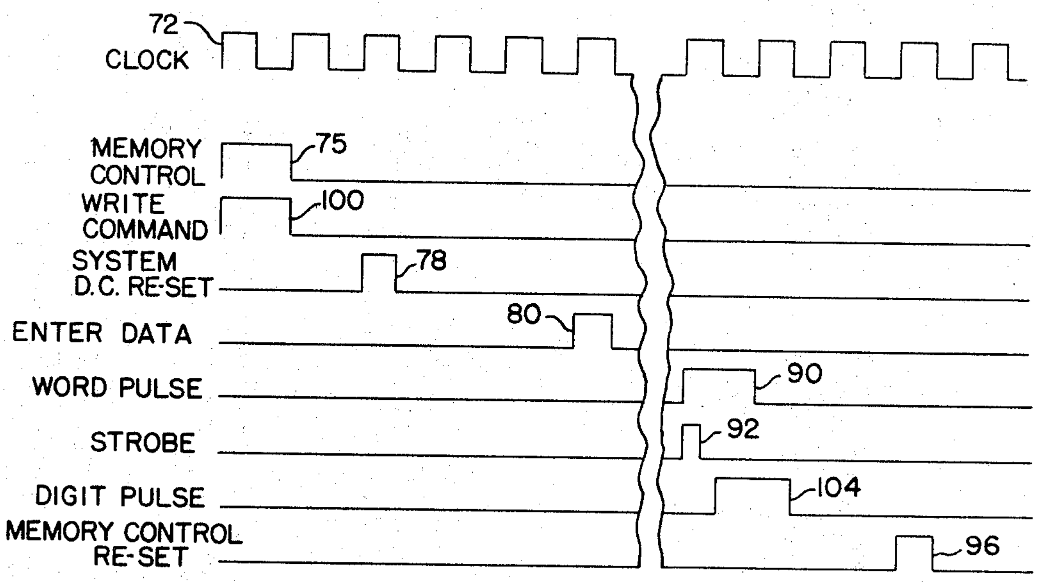
Figure 5:
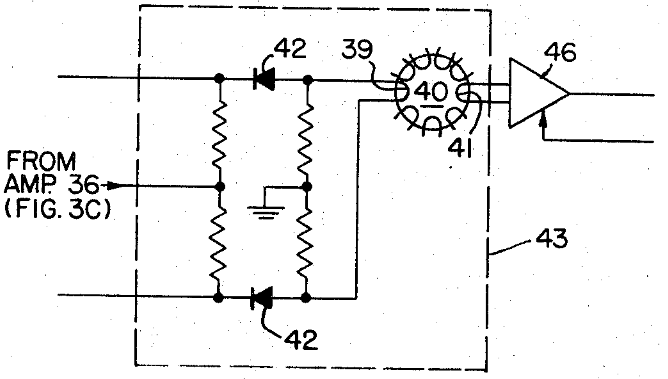

FIGS. 3A, 3B, 3C, and 3D, taken together, in left to right juxtaposition, constitute a schematic circuit diagram, partly in block form, of the memory sketchily indicated in FIGS. 1 and 2;

FIG. 4 is a schematic block diagram of the central, control portion of the logic circuitry of the memory;

FIG. 5 is a circuit diagram, on an enlarged scale, of one of the output gates indicated as blocks in FIG. 3C; and FIG. 6 is a timing diagram illustrating typical timing sequences for reading information from and inserting information into the memory.

Referring now to the drawings, a memory according to the presently preferred embodiment of the invention includes four arrays 10, 11, 12, and 13 of magnetic storage elements, each array including 2432 wires 16, called bit wires, of non-magnetic, electrically conductive material coated with thin films of anisotropic magnetic material. In each array, 512 conductors 18, called word straps, are folded around the wires normally to and insulated from them. Each of the word straps 18 constitutes a single turn electrical coil around each of the wires in its array.

For reading, it is only necessary to pass current through one word strap, and to sense the E.M.F. produced in response to the current in a selected one, or group of the bit wires 16. For writing, it is necessary to pass current through a selected word strap, and also through selected ones of the bit wires 16, arranging the relative timing so that the current in the selected bit wire, or wires persists through the decay time of the current in the word strap 18.

It has been found possible to produce magnetic coatings on the bit wires 16, which provide satisfactory operation when current pulses of the same magnitude are used in the word straps 18 both for reading and for writing. The circuit of the invention takes adavntage of this achievable quality, and thereby avoids the complexities heretofore encountered in designing circuits for memories where currents of different magnitudes were required in the word straps for reading and for writing, respectively.

The arrays 10–13 may be, for example, of the kind described in the following listed co-pending applications, all filed Jan. 22, 1968 and assigned to the present assignee: Ser. No. 699,672, "Filamentary Magnetic Memory and Method of Making It Using Flexible Sheet Material"; Ser. No. 699,673, "Filamentary Magnetic Memory and Methods of Making It Using Rigid Printed Circuit Cards"; Ser. No. 699,674, "Filamentary Magnetic Memory Including Word Straps Constituting More than One Turn Around Each Magnetic Filament." Their structural details form no part of the present invention, and the practice of the invention is not limited in respect of such details. It is only necessary that the arrays be capable of functioning in the manner described.

A single amplifier 22 is associated with each of the arrays 10–13. The output of the amplifier 22 in each of the arrays is connected to one end of each of the word straps 18 in its array. The inputs to the amplifiers 22 are selectively enabled by a decoding matrix 24 in response to an address signal furnished from an external source (not shown) through an ADDRESS REGISTER 25. The ends of the word straps 18 remote from the amplifiers 22 are connected to respective outputs of a WORD LINE DECODE matrix 26, corresponding straps 18 in all of the arrays being connected in common to respective output terminals of the matrix 26. The WORD LINE DECODE matrix 26 is also driven by the ADDRESS REGISTER 25.

When one of the amplifiers 22 is enabled, and one of the output terminals in the matrix 26 is also enabled, an energizing circuit is completed through only a single one of the word straps 18.

The bit wires 16, 2432 in each array, are arranged in respective bridge circuits, each bridge including four bit wires, one in each of the arrays 10–13. The logic is arranged to divide the bridge circuits into thirty-two groups of sevently-six bridges each, providing parallel operation for reading or writing seventy-six bits of information simultaneously. Selection of a particular group of seventy-six bridge circuits for reading and for writing is made through a binary-to-decimal decoder 30 responsively to a GROUP SELECTION register 32, which is conditioned by address information received from the external source. The decoder 30 selectively enables one of an array of thirty-two SELECTOR amplifiers 34 (FIG. 3B), which are used for writing information into the memory planes 10–13. The output of the decoder 30 also enables one of an array of thirty-two GROUP ADDRESS amplifiers 36 (FIG. 3C) to control the reading operation.

The output arrangement for reading is indicated in block diagram form in FIGS. 2 and 3C. The gate arrangement 43, by which plural bridge circuits share a common output amplifier, is shown schematically in FIG. 5.

For reading, opposite corner junctions of each circuit are connected to an input winding 39 of a transformer 40 through respective diodes 42, which are normally biased in the reverse direction to isolate the bridge circuit from the transformer. This is the point where the thirty-two words, or bytes of seventy-six bits each are formed.

Figure 3D:
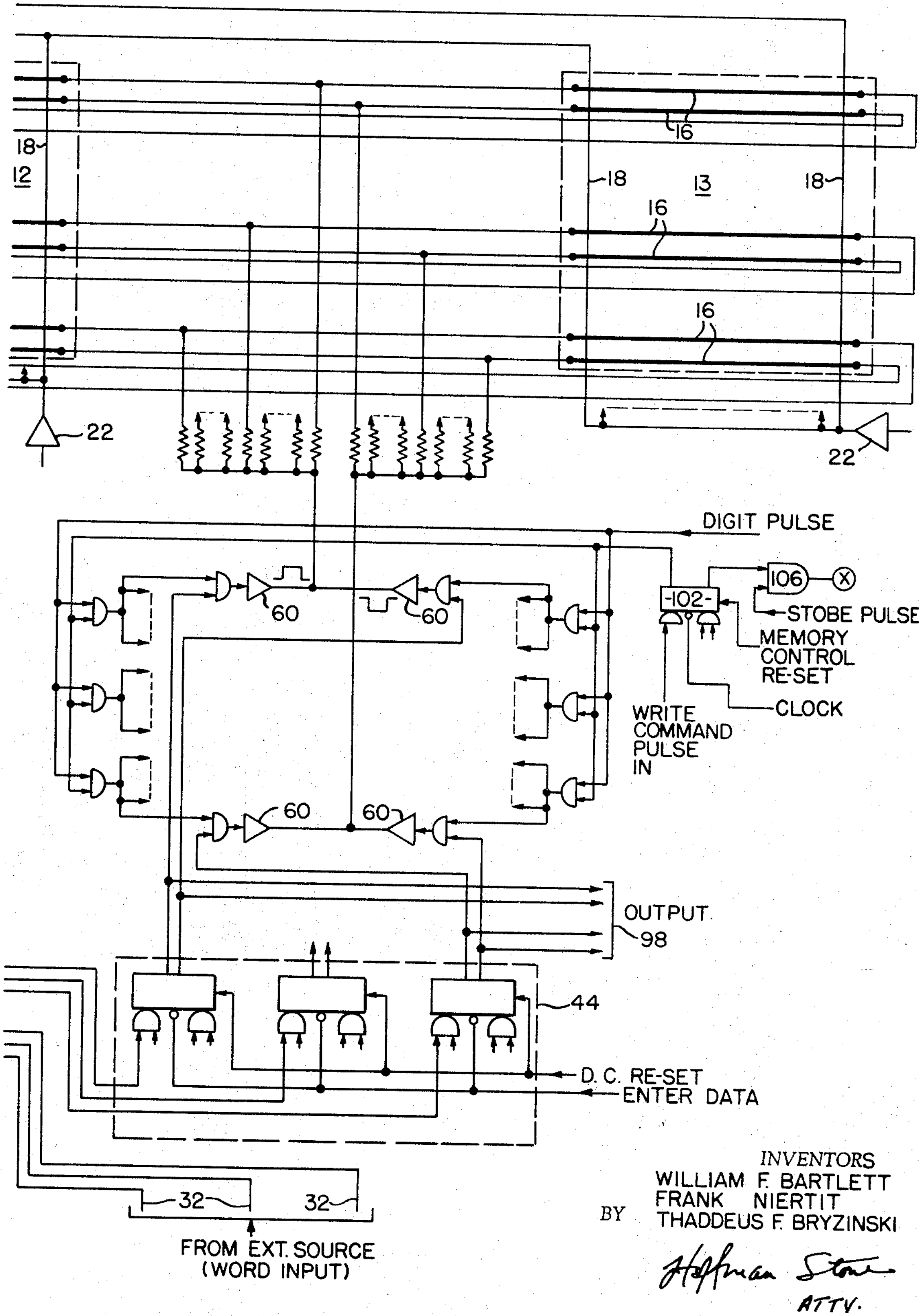

The outputs of the bridge circuits are OR'ed in groups of thirty-two to seventy-six respective inputs of an INPUT-OUTPUT register 44 (FIG. 3D). The first eight bridge circuits of the first group are connected to different respective input windings of a first one of the transformers 40, the single output winding 41 of which is connected across the input terminals of a differential transformer 46. The next eight bridge circuits of the first group are connected through a second transformer 40 to the input of a second differential amplifier 46. Similarly, the rest of the bridge circuits of the first group of thirty-two are connected through third and fourth ones of the transformers 40 to third and fourth differential amplifiers 46. The outputs of all four of the amplifiers 46 are connected through a main OR gate 50 to the appropriate input of the register 44. Theoretically, the same result would be achieved were all thirty-two bridge circuits representing the corresponding bits of each of the thirty-two words connected to separate windings of a single transformer and only a single amplifier 46 were used. In practice, however, the transformer cores must be relatively small because of the high frequency components of the signals that are handled, and it is difficult, if not impossible, to wind the required number of coils with adequate coupling upon cores of the required size. Therefore, the thirty-two words are broken down for purposes of feeding their outputs into the OR gates 50 into sub-groups of eight.

Thus, for reading, the first two matrices 24 and 26 define a circuit through only a single one of the word straps 22, thereby enabling identification of which one of the four arrays 10–13 is being read and the bit location along the bit wires 16. Selection of a particular group of seventy-six bit wires among the 2432 in the array is then made by the binary-to-decimal decoder 30 at the output of the GROUP SELECTION register 32.

For writing, the operation is generally similar, except that for amplifiers 46 at the outputs of the bridge circuits are not enabled, but are maintained inhibited. The INPUT-OUTPUT register 44 is set by data fed through the OR gates 50 from the external source, and drives an array of digit amplifiers 60 (FIG. 3D) for feeding current pulses of appropriate polarity through the bridge circuits as selected by the enabled one of the GROUP SELECTOR amplifiers 34. The digit amplifiers 60 and the GROUP SELECTOR amplifiers 34 are connected between respective opposite corner junctions of the bridge circuits different from the junctions to which the output transformers 46 are connected so that the current supplied by the digit amplifiers 60 has minimum effect upon the output amplifiers 46.

Further details of the circuit will be understood from a description of its operation in connection with the timing diagram of FIG. 6. All operations in the circuit are synchronized by a master clock 70 (FIG. 4), which may operate, for example, at a five mHz. rate, and have a square wave output form as indicated by the curve 72 (FIG. 6). All operations are synchronized by the clock 70 through appropriate gating circuits.

Operation is controlled by a FUNCTION GENERATOR 74, which is arranged as desired to produce the necessary control signals described hereinafter. The design of the FUNCTION GENERATOR is well within the skill of the art and a detailed circuit description is not necessary herein.

READING

For reading signals stored in the arrays 10–13, a MEMORY CONTROL circuit 76 recognizes a code from the external source and produces a momentary MEMORY CONTROL pulse 75, which persists for at least one full cycle of the clock 60, or slightly longer, to insure setting of a MEMORY CONTROL FLIP FLOP 77. The MEMORY CONTROL FLIP FLOP 77 is set by the MEMORY CONTROL pulse 75, and remains set for the duration of the read-out operation, until the desired information is delivered from the memory arrays 10–13 to the INPUT-OUTPUT register 44. Once set, the MEMORY CONTROL FLIP FLOP 77 triggers the FUNCTION GENERATOR 74, which thereupon produces a series of control signals in timed relationship.

First, a system D.C. RE-SET pulse 78 equal in duration to one half cycle of the output 72 of the clock is distributed to all of the registers in the system to re-set them in preparation for the start of the operation. Next, an ENTER DATA pulse 80 is applied to the input registers 25 and 32 and to the INPUT-OUTPUT register 44 for enabling the registers to receive information from the external source. During the reading operation, there are no signals at the WORD INPUT terminals 82 (FIG. 3D) from the external source, and the INPUT-OUTPUT register 44 remains in its re-set condition pending arrival of signals from the sense amplifiers 46.

The ADDRESS REGISTER 25 receives the address information from the external source through an array of terminals 84, and drives the ARRAY DECODE and WORD LINE DECODE matrices 24 and 26, respectively, to select the desired one of the word straps 18.

The GROUP ADDRESS register 32 (FIG. 3B) is also enabled by the ENTER DATA pulse 78 to energize one of the GROUP ADDRESS amplifiers 36, thereby to enable one of the gates 43 in each of the seventy-six output sections (not separately designated) which feed the INPUT-OUTPUT register through the OR gates 50. The GROUP ADDRESS amplifier is selected in accordance with the group address signals from the external source appearing at the group address input terminals 86. Time is then allowed as necessary to dissipate transient effects in the system and to establish a stable condition, whereupon a word pulse 90 is applied through the ARRAY DECODE matrix 24 to the selected one of the array drive amplifiers 22.

The amplifiers 46 at the outputs of the bridge circuits are normally inhibited. They are enabled momentarily by a relatively short pulse 92 called a strobe pulse, which begins coincidentally with the word pulse 90, but persists for less than one half cycle of the signal 72 from the main clock. Typically, the strobe pulse 92 is about seventy nanoseconds in duration. During the strobe pulse 92, the initial E.M.F.'s produced by the word pulse 90 in the selected group of the bit wires 16 are sensed and delivered through the OR gates 50 to the INPUT-OUTPUT register 44. After a short further delay, the FUNCTION GENERATOR 74 produces a MEMORY CONTROL RE-SET pulse 96, which is applied to re-set the MEMORY CONTROL flip-flop 77, thus cutting off further application of the system clock output 72 to the FUNCTION GENERATOR 74, and blocking the FUNCTION GENERATOR 74 from further operation pending the next operation of the MEMORY CONTROL 76. The system then remains quiescent in its set condition pending the next succeeding operation. The information delivered to the INPUT-OUTPUT register 44 remains continuously available at its output terminals 98 (FIG. 3D) for use by the external system (not shown).

WRITING

The writing operation is essentially the same as the reading operation, except that a WRITE COMMAND pulse 100 is received from the external source coincidentally with the initiating signal, and is applied to a WRITE COMMAND flip-flop 102 (FIG. 3D) to set it. Also, word input signals are applied from the external source to the word input terminals 82, and appear through the OR gates 50, at the inputs of the INPUT-OUTPUT register 44 to set it upon the occurrence of the ENTER DATA pulse 80. The output of the WRITE COMMAND flip-flop 102 partially enables the inputs of the digit amplifiers 60 enabling them to respond to the conditions of the INPUT-OUTPUT register 44 upon the occurrence of a DIGIT pulse 104, which is produced by the FUNCTION GENERATOR 74. The digit pulse 104 starts during the word pulse 90 and persists through its decay.

A second output of the WRITE COMMAND flip-flop 102 inhibits a gate 106 through which the strobe pulse 92 is applied to the sense amplifiers 46, thereby keeping the amplifiers 46 inhibited during the write operation. The WRITE COMMAND flip-flop 102 is re-set by the MEMORY CONTROL RE-SET pulse 96 at the end of the operation, returning the system to its quiescent condition.

What is claimed is:

1. A magnetic memory comprising:

(a) four generally planar arrays of bit wires, the bit wires in each of said arrays lying parallel to each other, each of said bit wires being of a non-magnetic electrically conductive material coated with a film of anisotropic magnetic material having a preferred direction of magnetization circumferentially of the wire, (b) each of said arrays including conductive straps extending across said wires on opposite sides of said arrays normally to said bit wires and electrically insulated therefrom, (c) means connecting corresponding bit wires in all of said arrays in series to form bridge circuits, each of said bridge circuits including one of said bit wires in each of said arrays, (d) four drive amplifiers associated respectively with said arrays, the output of each of said amplifiers being connected to one terminal of each of said conductive strips in its respective array, (e) means for selectively enabling said amplifiers one at a time, (f) means connected to corresponding ones of said conductive strips in all of said arrays for selectively closing respective current paths each leading to one of said strips in each array, (g) means for applying an input signal selectively to said amplifiers through said selective enabling means, (h) means connected across opposite corner junctions of said bridge circuits for detecting momentary unbalanced conditions in said bridge circuits, and (i) means for operating said selective enabling means, said means for applying signals to said amplifiers, and said detecting means in predetermined timed relationship.

2. A magnetic memory according to claim 1, further including:

(a) an output register responsive to said detecting means for storing signals indicative of conditions detected by said detecting means, (b) means for inhibiting said detecting means, (c) means for inserting signals into said register from an external source during times when said detecting means are inhibited, and (d) means responsive to said register for passing currents through selected ones of said bridge circuits in timed relationship with the operation of said means for applying an input signal.

3. A magnetic memory according to claim 1, further including:

(a) an output register responsive to said detecting means for storing signals indicative of conditions detected by said detecting means, (b) OR gates between the outputs of said detecting means and the inputs of said register for grouping said detecting means according to a predetermined pattern with the outputs of several of said detecting means being OR'ed to a single input of said register.

References Cited

UNITED STATES PATENTS

| | | | |
|---|---|---|---|
| 3,378,822 | 4/1968 | Kaufman et al. | 340—174 |
| 3,378,823 | 4/1968 | Kaufman et al. | 340—174 |
| 3,390,383 | 6/1968 | Snyder | 340—174 |
| 3,432,823 | 3/1969 | Snyder | 340—174 |

STANLEY M. URYNOWICZ, Jr., Primary Examiner